United States Patent
Williams

(10) Patent No.: US 8,660,844 B2
(45) Date of Patent: Feb. 25, 2014

(54) SYSTEM AND METHOD OF EVALUATING USER SIMULATIONS IN A SPOKEN DIALOG SYSTEM WITH A DIVERSION METRIC

(75) Inventor: Jason Williams, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1512 days.

(21) Appl. No.: 11/933,734

(22) Filed: Nov. 1, 2007

(65) Prior Publication Data

US 2009/0112586 A1    Apr. 30, 2009

Related U.S. Application Data

(60) Provisional application No. 60/982,325, filed on Oct. 24, 2007.

(51) Int. Cl.
  *G10L 15/01* (2013.01)
(52) U.S. Cl.
  USPC .......................................................... 704/239
(58) Field of Classification Search
  USPC .......................................................... 704/239
  See application file for complete search history.

(56) References Cited

U.S. PATENT DOCUMENTS

| | | | |
|---|---|---|---|
| 7,003,079 B1 | 2/2006 | McCarthy et al. | |
| 7,617,202 B2 * | 11/2009 | Brill et al. | 1/1 |
| 7,634,406 B2 * | 12/2009 | Li et al. | 704/244 |
| 7,835,910 B1 * | 11/2010 | Hakkani-Tur et al. | 704/243 |
| 2005/0131708 A1 | 6/2005 | Palma et al. | |

OTHER PUBLICATIONS

Chao Wang et al., "Language Model Data Filtering via User Simulation and Dialogue Resynthesis", in Proc. of Eurospeech, 2005.
Ed. Filisko et al., "Learning Decision Models in Spoken Dialogue Systems via User Simulation", in Proc. AAAI Workshop on Statistical and Empirical Approaches for Spoken Dialogue Systems, Boston, Massachusetts, USA Jul. 17, 2006.

* cited by examiner

*Primary Examiner* — Susan McFadden

(57) ABSTRACT

Systems, methods and computer-readable media associated with using a divergence metric to evaluate user simulations in a spoken dialog system. The method employs user simulations of a spoken dialog system and includes aggregating a first set of one or more scores from a real user dialog, aggregating a second set of one or more scores from a simulated user dialog associated with a user model, determining a similarity of distributions associated with each of the first set and the second set, wherein the similarity is determined using a divergence metric that does not require any assumptions regarding a shape of the distributions. It is preferable to use a Cramér-von Mises divergence.

14 Claims, 14 Drawing Sheets

SYSTEM AND METHOD OF EVALUATING USER SIMULATIONS IN A SPOKEN DIALOG SYSTEM WITH A DIVERSION METRIC

PRIORITY CLAIM

The present application claims the benefit of U.S. Provisional Application No. 60/982,325, filed Oct. 24, 2007, the contents of which is incorporated herein by reference in its entirety.

BACKGROUND OF THE INVENTION

1. Field of the Invention

The present invention relates to simulations of user interaction with spoken dialog systems, and more specifically to evaluating simulations of users using a divergence metric.

2. Introduction

Traditionally, spoken dialog systems have been hand-built by researchers, which is problematic because a human designer needs to consider innumerable dialog situations, many of which can be difficult to foresee. To address this, researchers have begun incorporating machine learning techniques into spoken dialog systems. The idea is for a (human) designer to provide the high-level objectives, and for the machine learning algorithm to determine what to do in each dialog situation.

Machine learning algorithms for dialogs usually operate by exploring different dialog strategies and making incremental improvements. This process, called training, often requires thousands or millions of dialogs to complete, which is clearly infeasible with real users. As a result, machine learning algorithms are usually trained with a user simulation, which is a computer program or model that is intended to be a realistic substitute for a population of real users.

Ultimately, the success of a machine learning approach depends on the quality of the user simulation used to train it. Yet, despite this, there is no accepted method to evaluate user simulations. This is especially problematic because machine learning-based dialog systems are often trained and evaluated on user simulations alone, not on real users. Without some quantification of user simulation reliability, it is hard to judge claims about machine learning approaches not evaluated on real users. Accordingly, what is needed is an improved method of using user simulation in dialog systems

SUMMARY

User simulations are increasingly employed in the development and evaluation of spoken dialog systems. However, there is no accepted method for evaluating user simulations, which is problematic because the performance of new dialog management techniques are often evaluated on user simulations alone, not on real people. In this disclosure, a novel method of evaluating user simulations is proposed. A user simulation is a predictor of the performance of a dialog system, where per-dialog performance is measured with a domain-specific scoring function. The divergence between the distribution of dialog scores in the real and simulated corpora provides a measure of the quality of the user simulation, and it is proposed that the Cramér-von Mises divergence is preferably for this task. To demonstrate this technique, a corpus of callers was studied with real information needs and show that the Cramér-von Mises divergence conforms to expectations. Finally, simple tools are shown which enable users to interpret the statistical significance of comparisons between user simulations.

Disclosed are systems, method and computer-readable media for evaluating user simulations in a spoken dialog system. A method embodiment includes aggregating a first set of one or more scores from a real user dialog, aggregating a second set of one or more scores from a simulated user dialog associated with a user model, determining a similarity of distributions associated with the first and second sets, wherein the similarity is determined using a divergence metric that does not require any assumptions regarding a shape of the distribution. It is preferable that the Cramér-von Mises divergence is used inasmuch as it places more emphasis on the mean in determining the similarity then does other measurements, such as the the Kahlback-Leibler divergence.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

This disclosure suggests a quality measure for user simulations. The quality measure is designed to fill the same role as a metric like word error rate (WER) provides for speech recognition accuracy. WER serves a valuable role by enabling speech recognizers to be rank-ordered, by quantifying improvements in a recognition algorithm, and by providing a measurement of the gap between observed and perfect performance. In the same way, the evaluation metric presented here enables user simulations to be rank-ordered, allows an improvement in a user simulation to be quantified, and provides a measurement of the gap between the observed and perfect user simulation.

The evaluation method operates as follows. First, since different factors are important in different domains, an example method relies on a domain-specific scoring function, which assigns a real-valued score to each dialog. Scores from real and simulated dialogs are aggregated to estimate two distributions, and the user simulation is evaluated by determining the similarity of these distributions using a normalized Cramér-von Mises divergence. This Cramér-von Mises divergence is known but in non-speech applications. See Anderson, T. 1962, "on the distribution of the two-sample Cramér-von Mises criterion," Annals of Mathematical Statistics 33(3), 1148-1159, incorporated herein by reference.

The normalized Cramér-von Mises divergence has a host of desirable properties for this task. First, it is designed to handle small samples from one or both distributions, which is significant because there may be only 50 or 100 real (human-machine) dialogs available in a given domain. In addition, the Cramér-von Mises divergence makes no assumption about the parametric form of the distributions—such as assuming a normal or uniform distribution—which is important because the parametric form of the score distributions will not be known. Moreover, the Cramér-von Mises divergence accounts for the notion of samples from a "true" distribution and a "modeled" distribution in a principled way. Finally, the normalization enables comparisons to be made across experiments, and allows researchers to report user simulation performance on a standardized scale.

Figure 1:
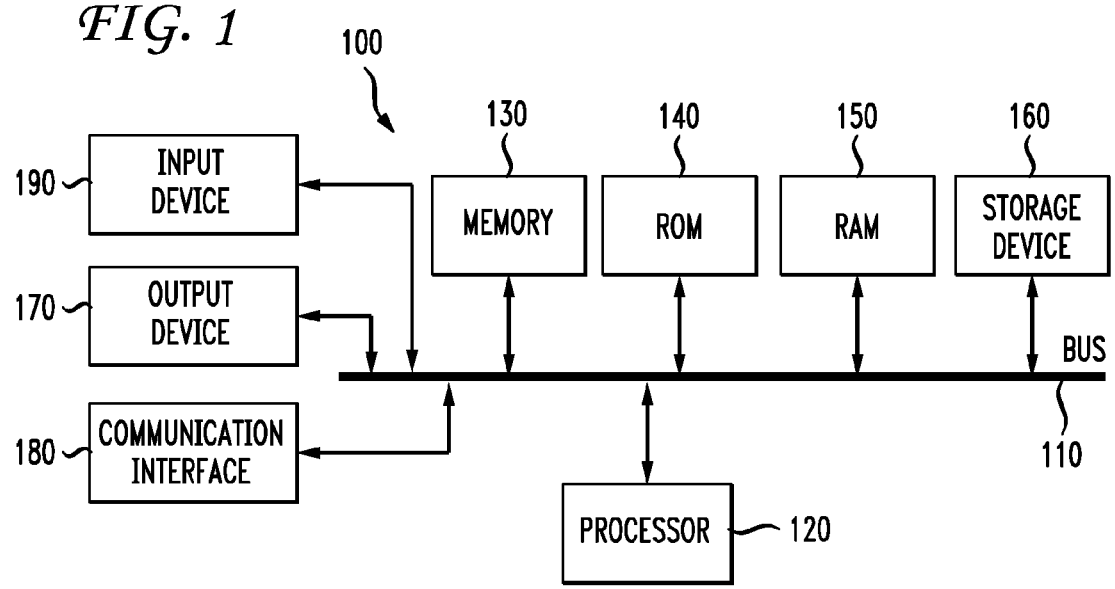
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The present invention relates to an improved method of generating a spoken dialogue service. A computer system may process some or all of the steps recited in the claims. Those of ordinary skill in the art will understand whether the steps can occur on a single computing device such as a personal computer having a Pentium central processing unit, or whether some or all of the steps occur on various computer devices distributed in a network. The computer device or devices will function according to software instructions provided in accordance with the principles of the invention. As will become clear in the description below, the physical location of where various steps in the methods occur is irrelevant to the substance of the invention disclosed herein. The important aspect of the invention relates to the method of using existing data associated with an enterprise, such as a company, to rapidly deploy a spoken dialogue system having acceptable accuracy rates for the domain of information and conversation associated with the enterprise. Accordingly, as used herein, the term "the system" will refer to any computer device or devices that are programmed to function and process the steps of the method.

2 Background and Motivation

Figure 2A:
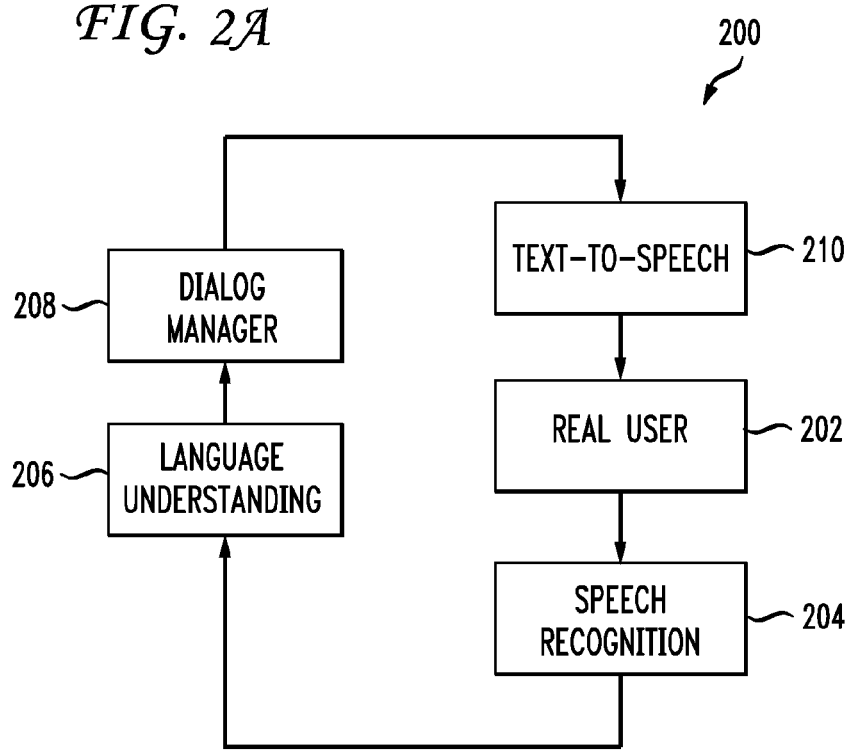
FIG. 2A illustrates a basic spoken dialog system.
Figure 2B:
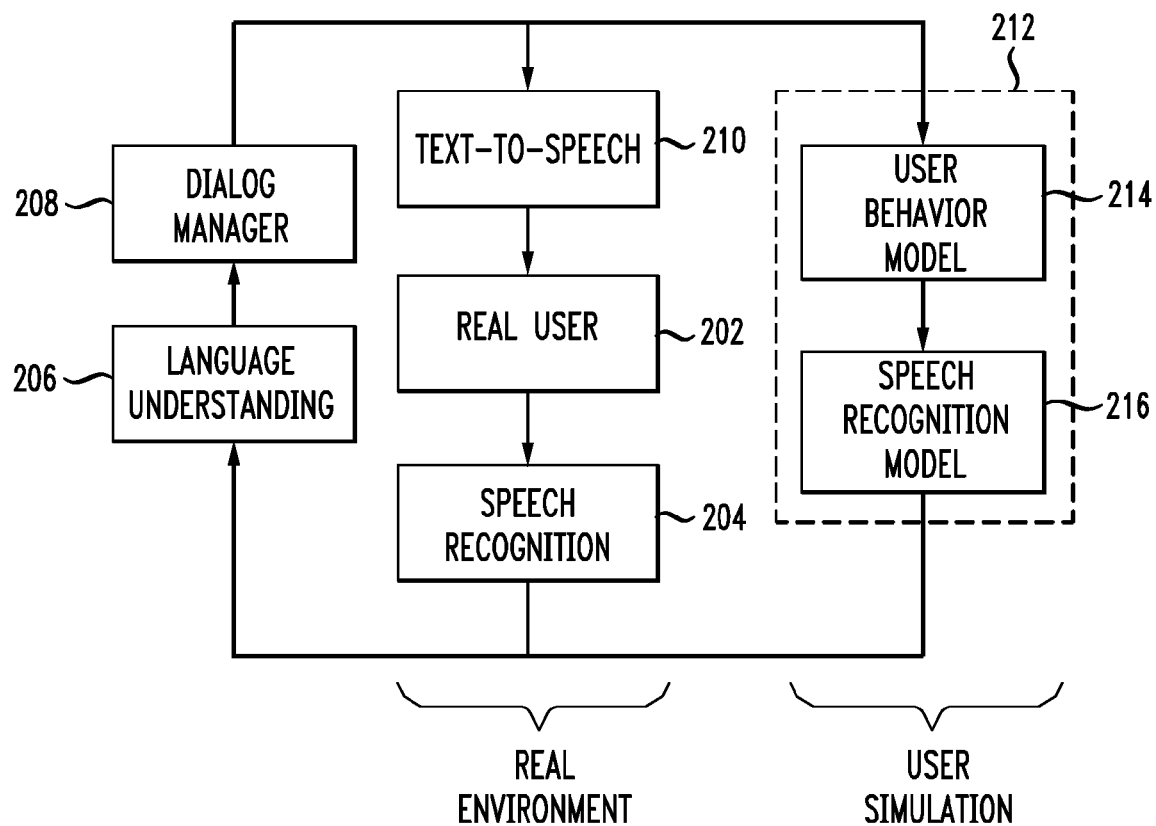
FIG. 2B illustrates a logical diagram showing how user simulation can be used to simulate dialogs.

A spoken dialog system helps a user to accomplish some goal through spoken language, such as booking an airline reservation, restoring service to an inter-net connection, or selecting music in an automobile. FIG. 2A shows the logical components of a spoken dialog system 200. A dialog manager 208 decides what to say to a user and passes a text string to a text-to-speech engine 210 which renders this text string as audio for the user to hear. The user 202 speaks in response, and this audio is processed by a speech recognition engine 204 which converts the audio into a (possibly erroneous) text string. This text string is passed to a language understanding component 206 which attempts to extract the caller's underlying meaning or intent from the text string. This intent is passed back to the dialog manager, which maintains an internal state and updates this state based on the result from the language understanding component. The cycle then repeats until either the goal is achieved or the user (or system) abandons the conversation.

In practice, spoken dialog systems 200 cope with significant uncertainty: speech recognition is error-prone with error rates for state-of-the-art systems commonly around 30%, and users' behavior is highly unpredictable. This uncertainty makes it difficult for a dialog designer to anticipate all of the situations a dialog system may encounter, and as a result dialog designers usually resort to sub-optimal heuristics (such as frequent use of confirmation questions) to keep the design process tractable.

Recently, researchers have begun applying machine learning techniques to the problem of dialog design. The essential idea is that the human designer provides high-level objectives, and an optimization or planning algorithm determines the detailed plan. In particular, Markov decision processes (MDPs) have been extensively studied, and this research has given rise to sophisticated and novel optimization schemes.

In one way or another, the use of machine learning to optimizing a dialog design relies on a user simulation. A user simulation is a computer program or model that is intended to be a realistic substitute for a population of real users and the speech recognition channel through which they communicate with the spoken dialog system. A user simulation consists of a user behavior model which maintains an internal state and generates textual synthetic user responses, and a speech recognition model which simulates the speech recognition process, possibly introducing errors. For example, MDP optimization typically operates by conducting thousands or millions of simulated dialogs, making gradual, periodic improvements. In addition, POMDPs also employ a user simulation to infer the likelihood of various user actions. FIG. 2A shows a logical diagram, where the dotted box 212 indicates the two elements (user behavior model 214 and speech recognition model 216) of the user simulation. Also shown is the real environment with the TTS module 210, real user 202 and speech recognition module 204.

In evaluations with real users, dialog systems 200 augmented with machine learning have outperformed reasonable baselines. In many studies, no measurement of the accuracy or reliability of the user simulation is reported. As such, it is hard to judge whether performance improvements will hold once systems are deployed to real users.

There has been some work examining whether a user simulation produces responses that a real user would have generated in the same context, and whether a user simulation generates the same variety of responses observed in real dialogs. Researchers propose a broad set of tests for comparing simulated and real dialogs, such as computing the precision and recall of simulated vs. real user responses, and comparing the distribution of turn lengths, dialog lengths, ratio of user to machine actions, and so on. The various tests proposed form a useful and powerful toolkit for identifying and investigating differences between user simulations. By applying these tests to three user simulations from the literature and several corpora of real dialog data, interesting and important strengths and weaknesses of each user simulation are identified. However, researchers do not take up the problem of a single quality measure for a user simulation. It is not clear how to combine the results of each of the tests in the toolkit to rank order two user simulations, and reporting on all of the tests would be cumbersome for researchers.

Others have evaluated user simulations by computing the "dialog similarity" of a real and simulated corpus. Each of these two corpora are viewed as the output of a hidden Markov model (HMM), and the dialog similarity measure is defined as the divergence between the distributions comprising these two HMMs. This method has the desirable property of producing a scalar-valued distance which can be used to rank order different user simulations. However, casting corpora as the output of an HMM makes strong assumptions about the structure of dialog, and it is not clear how to determine how well the estimated HMMs match the corpora. In addition, it is unclear how to expresses the relative importance of different dialog elements, such as task completion and dialog length, in a given domain. Finally, when conveying results, many details of the HMMs such as their states, transition structures, parameterizations, estimation methods, etc. would need to be discussed. Reporting and understanding this level of detail in the course of developing dialog systems would be challenging for practitioners and researchers.

A central problem faced by researchers is that there is no accepted, easily reportable statistic providing an indication of the quality of a user simulation. This invention seeks to fill this gap. What is desired is a statistic akin to word error rate (WER) for speech recognition accuracy, perplexity for language modeling, or BLEU score for machine translation. Disclosed herein is an evaluation measure which can reliably discern whether one user simulation is better than another and which can be easily computed and reported by researchers.

The inventor starts by addressing the overall objective of the user simulation. Although past work has argued that the aim of a user simulation is to engage in "realistic" dialogs, basing an evaluation measure on realism seems problematic. Indeed, Schatzmann et al. (2005) reports that "it is of course not possible to specify what levels of [evaluation metrics] need to be reached in order to claim that a user simulation is realistic." Schatzmann, J., Georgila, K., Young, S., 2005. Quantitative evaluation of user simulation techniques for spoken dialogue systems. In: Proc SIGdial Workshop on Discourse and Dialogue, Lisbon. pp. 178-181. Realism is a reasonable aim, but in practice it is unclear how it could be implemented as a quantitative metric.

Here the inventors take a different view. For the purposes of an evaluation metric, the role of a user simulation should be to accurately predict the performance of a dialog system when it is deployed to a certain user population:

Statement 1: For a given dialog system $\mathbb{D}$ and a given user population $\mathbb{U}_0$, the goal of a user simulation $\mathbb{U}_1$ is to accurately predict the performance of $\mathbb{D}$ when it is used by $\mathbb{U}_0$.

In other words, the inventor views a user simulation as a predictive tool, and a quality measure will assess the accuracy of that prediction. Note that this prediction is dependent on a particular dialog system D and a particular user population $U_0$. Here, user population is defined to include the variations expected across users and the variations expected for each individual user, including variations in initiative levels, dialog act frequencies, patience, and so on. For a goal-oriented dialog system, the user population includes the variety and frequency of the tasks that users are trying to accomplish.

The quantity being predicted is "performance" of a dialog system, which must defined concretely. The inventors first address performance in a single dialog:

Statement 2: The performance of a dialog system $\mathbb{D}$ in a particular dialog $d_{(i)}$ can be expressed as a single real-valued score $x_{(i)}$, computed by a scoring function $\mathbb{Q}$ $(d_{(i)})=x_{(i)}$.

The scoring function itself is dependent on the dialog system and is created by its designer. The scoring function captures all of the factors that the designer believes are relevant—such as task completion, dialog length, and user satisfaction—and combines them in some way. The designer may base the scoring function on business requirements or a weighted sum of factors intended to predict user satisfaction such as the PARADISE method. In any case, the main aim of the dialog design process is to make trade-offs between competing needs (for example, speed and accuracy) appropriately, and the scoring function codifies this in mathematical terms. Often, the scoring function is already available since it is required by many machine-learning algorithms, such as Markov decision processes and partially observable Markov decision processes, where it is called a reward function. The inventors will not define the scoring function explicitly since this scoring function will be very different in different domains: for example, a scoring function in the entertainment domain will likely be very different than a scoring function in the banking domain.

Next, these scores can be aggregated into sets:

Statement 3: A given user population $\mathbb{U}_0$ using dialog system $\mathbb{D}$ will yield a set of scores $S_0=(x_{(1)}^0, \ldots, x_{(N_0)}^0)$. Similarly, a user simulation $\mathbb{U}_1$ using dialog system $\mathbb{D}$ will yield a set of scores $S_1=(x_{(1)}^1, \ldots, x_{(N_1)}^1)$.

With these two sets, we can now state the basic intuition of our quality measure for a user simulation:

Statement 4: A user simulation $\mathbb{U}_1$ may be evaluated by computing a real-valued divergence $D(S_0\|S_1)$.

A divergence is defined as $D(X\|Y)$ to be a non-negative, real-valued measurement of how well some set X, which is taken to be samples from a "true" distribution, is matched by some other set Y, taken to be a "model" of the truth. Here, a divergence expresses how well the scores produced by the user simulation $S_1$ match the scores produced with real users $S_0$. Similar to a distance measurement, $D(X\|X)=0$; however, unlike a distance measurement, a divergence is not necessarily symmetric: $D(X\|Y)$ is not necessarily equal to $D(Y\|X)$.

Because a divergence is a scalar (a real number), divergences to different user simulations can be rank-ordered, enabling direct comparisons to be made between different user simulations.

In the limit of an infinite number of dialogs, the sets S0 and S1 could be described by probability density functions p0(x) and p1(x). In practice, however, collecting real dialogs is expensive and time-consuming, and there may only be N0=50 or 100 real dialogs. As a result, an estimate of the probability density function p0(x) is likely to be unreliable. Moreover, it seems unlikely that we will know the parametric form of p0(x) in advance. Thus, our divergence measurement should not make any assumption about parametric form.

Given these considerations, the inventors conceived of using divergence measure the normalized Cramér-von Mises divergence:

$$D(F_0\|F_1) = \alpha \sqrt{\sum_{i=1}^{N_0} (F_0(x_{(i)}^0) - F_1(x_{(i)}^0))^2} \quad (1)$$

where $F_1$ is the empirical distribution function (EDF) of the data $S_j=(x_{(1)}^j, \ldots, x_{(N_j)}^j)$:

$$F_j(x) = \frac{1}{N_j} \sum_{i=1}^{N_j} \begin{cases} 1 & \text{if } x_{(i)}^j < x \\ \frac{1}{2} & \text{if } x_{(i)}^j = x \\ 0 & \text{if } x_{(i)}^j > x \end{cases} \quad (2)$$

and $\alpha$ is a normalizing constant $$\alpha = \sqrt{\frac{12N_0}{4N_0^2 - 1}} \quad (3)$$

which scales the upper bound of $D(F_0\|F1)$ to be 1. Those of skill in the art will understand how to derive the variable $\alpha$.

The normalized Cramér-von Mises divergence is based on a family of statistical tests originally developed by Cramér (1928) and von Mises (1931) which measure agreement between observed sets of data. Equation 1 is based on a variant of the Cramér-von Mises criterion studied by Anderson (1962), augmented here with a normalization constant $\alpha$.

EDF F(x) gives an estimate of the percent of the observed data which is less than x, and the Cramér-von Mises divergence is a sum of the squared differences between the EDFs of the real data S0 and modeled data S1 evaluated at the real data points S0.

The normalized Cramér-von Mises divergence has the properties desired for evaluating user simulations. Because it operates on the empirical distribution function (EDF), it makes no assumptions about the parametric form of p(x) and requires no tuning parameters. In addition, the Cramér-von Mises family of tests is regarded as having more statistical power than other non-parametric methods for comparing EDFs, such as the KolmogorovSmirnov test. Moreover, if F0(x) and F1(x) are co-incident at the points in S0, then D (F0||F1)=0. In other words, if S0 and S1 have the same distribution of scores, then the user simulation U1 will be taken to be a perfect model of the real user U0. Finally, the normalized Cramér-von Mises divergence provides a common scale of [0, 1] across experiments and domains, independent of N0. This feature enables scores to be easily interpreted and compared across different experiments and different domains.

In the speech and language community, a common divergence measurement is the KullbackLeibler (KL) divergence $D_{KL}(f_0\|f_1) = \int_{-\infty}^{\infty} f_0(x) \log(f_0(x)/f_1(x))dx$. See Kullback, S., Leibler, R., 1951. On information and sufficiency. Annals of Mathematical Statistics 22, 79-86.

Figure 3:
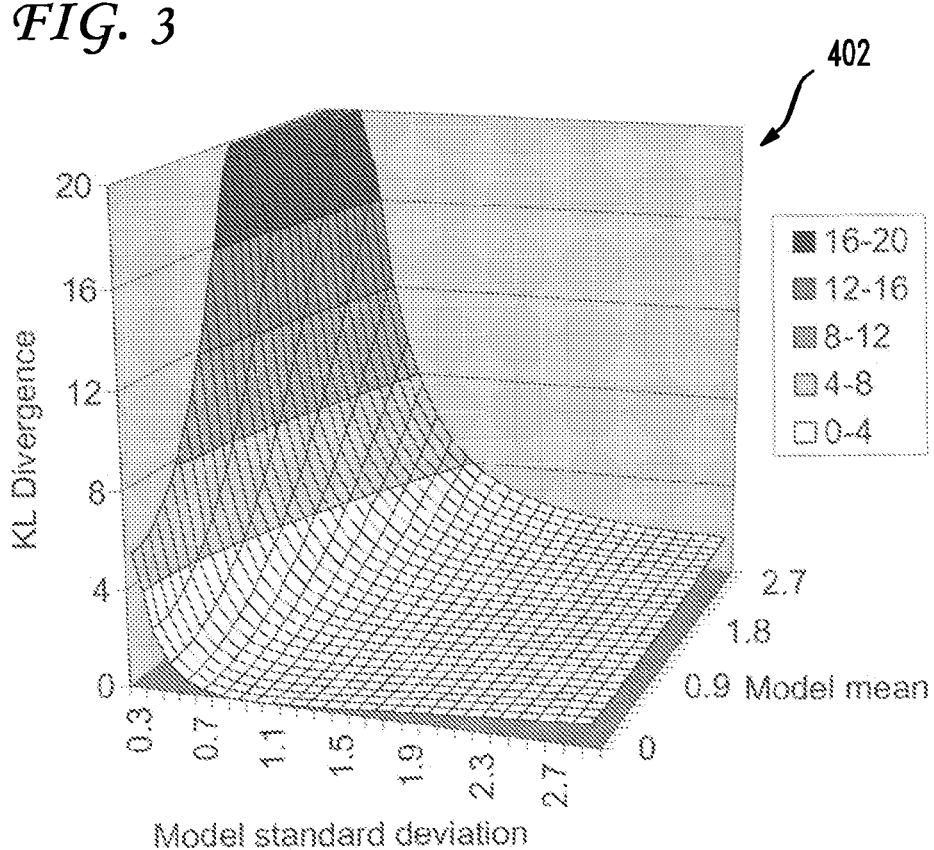
FIG. 3 illustrates a Kahlback-Leibler divergence.

The KL divergence is less desirable for this task for three main reasons. First, it requires estimating densities f0 and f1 from the data S0 and S1, which in turn requires making assumptions that can introduce error. Second, interpreting a KL divergence is troublesome: KL divergence is (positively) unbounded which precludes measuring where on the spectrum of best to worst a user simulation lies. By contrast, the normalized Cramér-von Mises divergence ranges from 0 to 1 where 0 implies the best possible user simulation and 1 implies a completely mis-estimated user simulation. Finally, the KL divergence places a disproportionately high penalty on under-estimating variability. This is illustrated in FIGS. 3 and 4, which show the KL 402 and Cramér-von Mises 404 divergences from a Gaussian with mean 0 and standard deviation 1 to other Gaussians with various means and variances.

Figure 4:
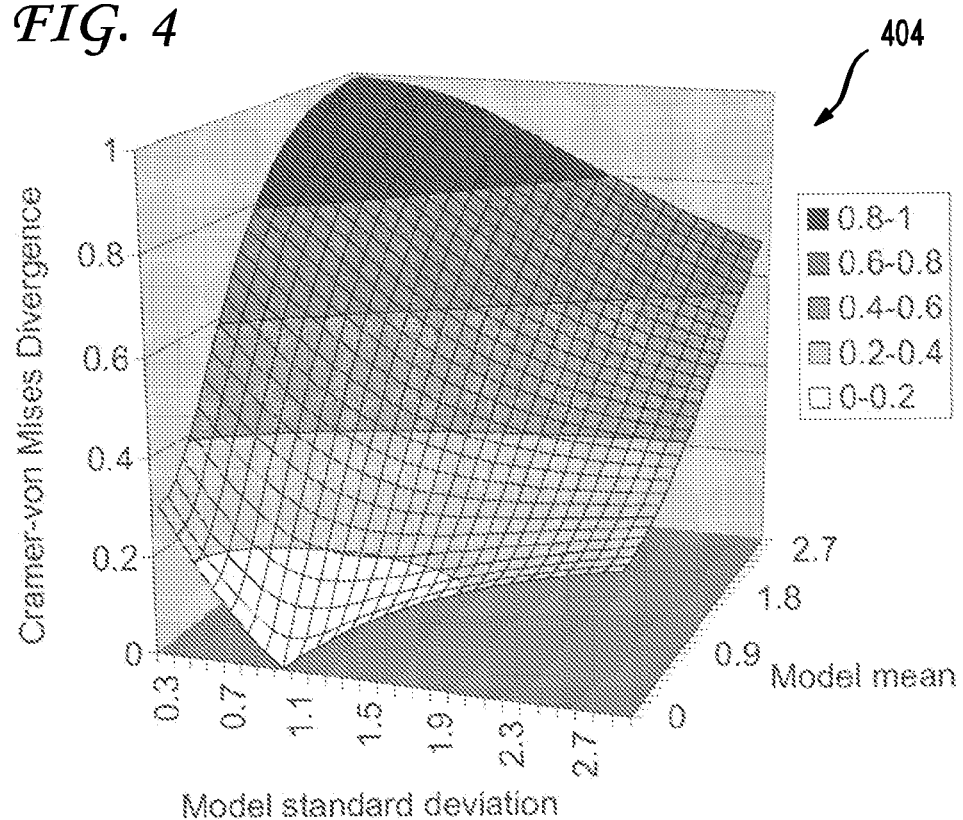
FIG. 4 illustrates a Cramer-von Mises divergence.

The Kullback-Leibler divergence DKL (f0||f1) 402 and the Cramér-von Mises divergence D (F0||F1) 404 are shown in FIG. 4, where f0 is the density and F0 is the cumulative distribution functions of a Gaussian with mean 0 and standard deviation 1. In these plots, the horizontal axes of the plots indicate the mean and standard deviation of F1 and f1, and the height of the surface indicate the divergence.

Under-estimation of the standard deviation leads to explosive growth in the KL divergence, whereas the Cramér-von Mises divergence makes a more balanced trade-off between errors in the mean and standard deviation. In this task, it doesn't seem appropriate to encode a preference for over-estimating variances.

To summarize the Cramér-von Mises method, each real dialog and each simulated dialog is assigned a score by a scoring function created by the system designer. The aim of a user simulation is to interact with a dialog system and predict the distribution of scores that will be observed when the same dialog system is deployed to a population of real users. Since in practice there may be few real dialogs, and since the form of the score distributions is unlikely to be known, the inventors choose the normalized Cramér-von Mises divergence which has properties well-suited to this application. The statement of the Cramér-von Mises divergence includes a normalization constant that facilitates comparison of user simulations across domains.

Comparing two user simulations S1 and S2 simply requires computing D (F0||F1) and D (F0||F2), and the minimum of these divergences is the better user simulation. A logical diagram of this process is shown in FIG. 5.

This metric plays an important role in system development by enabling user simulations to be compared to each other, and by quantifying the divergence between a user simulation and a population of real users. In comparison to the HMM-based method, this method has several advantages. The Cramér-von Mises method makes no assumptions about the structure of dialogs; its scoring function enables dialog designers to explicitly specify the relative importance of dialog elements such as speed and accuracy in a given domain; it operates directly on the data, making no parametric assumptions; and the scoring function and measurement are easy to report and interpret. These represent advantages of this approach.

Figure 5:
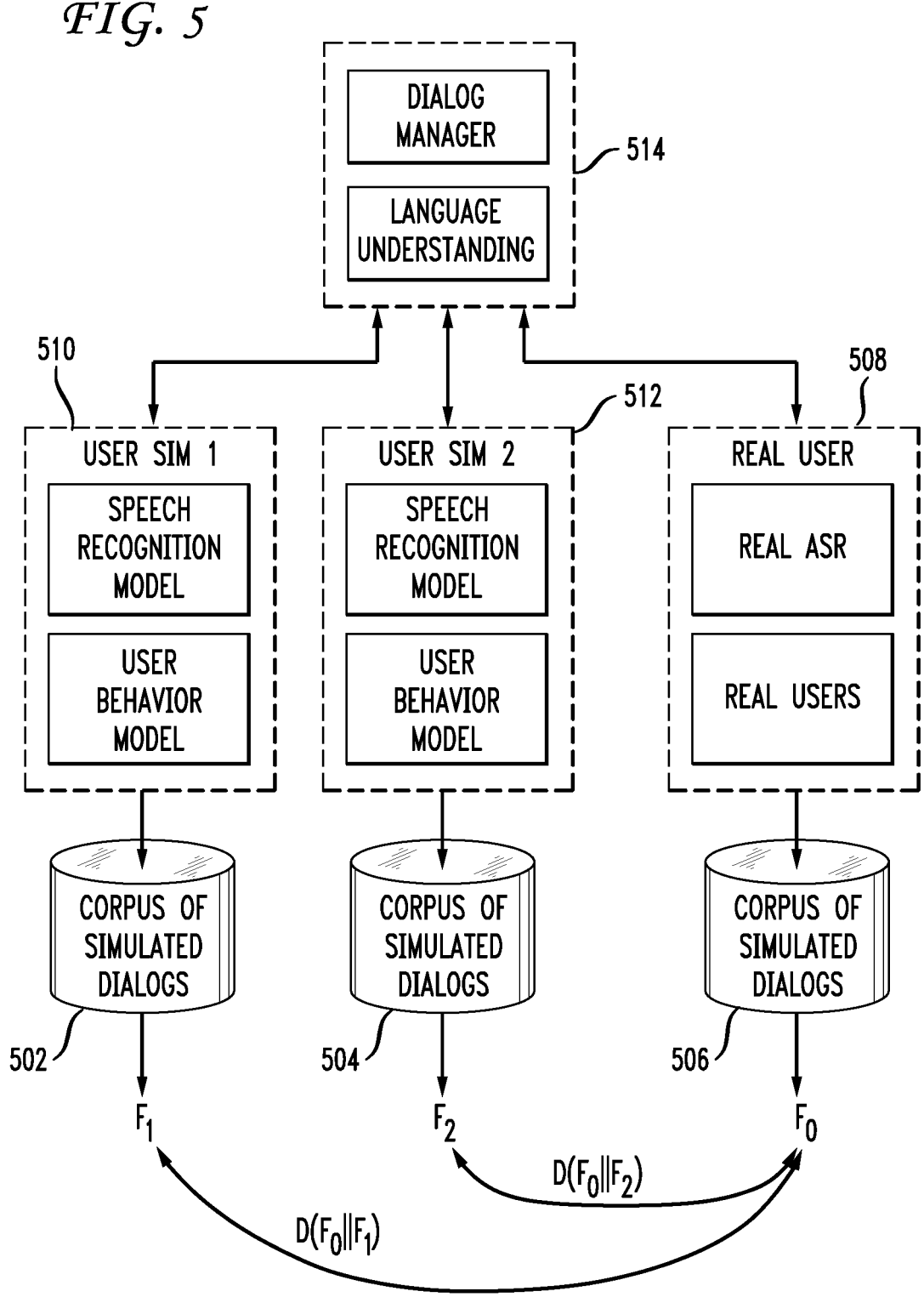
FIG. 5 illustrates a block diagram summarizing a method for evaluating user simulations.

FIG. 5 logical diagram summarizing the method for evaluating user simulations. A domain-speech scoring function Q scores each of the real human-computer 506 and simulated human-computer dialogs 502, 504 to form sets S0, S1, and S2, which are in turn used to form the empirical distribution function F0, F1, and F2, respectively. Several user simulations, user Sim1 500 and user Sim2 512 are shown with a real user 508 interacting with the dialog manager and language understanding modules of the system 514.

Even so, this method may have several limitations. First, just as evaluation metrics like WER do not suggest how a speech recognizer could be improved, the inventors do not expect that the inventive metric will suggest how a user simulation could be improved. Schatzmann et al. (2005)'s toolkit seems more appropriate for this type of analysis. Also, even if the dialog scores in the sets S0 and S1 and coincident, the true and modeled dialogs may still be quite different in terms of length or task completion. This is inevitable with any scalar evaluation metric: for example, in speech recognition, identical word error rates may have different measurements of deletions, insertions, and substitution errors. Here, the intention is that the domain-specific scoring function weights the relevant factors of the dialog appropriately, such that any aliasing is by definition acceptable.

Finally, the method requires real dialog data from the dialog system being evaluated, but in practice, a user simulation is often used to build (e.g., via machine learning) a new dialog manager. Theoretically, it is not correct to make claims about the quality of a user simulation interacting with some new dialog system for which real dialogs do not exist. Nonetheless, it is expected that—all else being equal—a user simulation that is a better performance predictor of some dialog system is likely to be a better performance predictor on a new dialog system.

Next is presented a series of experiments with a real dialog system that strives to confirm that this evaluation procedure is consistent with intuitions and can be applied. The inventors strive to show that the normalized Cramér-von Mises evaluation procedure agrees with expected results by studying a corpus of dialogs with a real dialog system. A series of user simulations are created and it is shown that increasingly realistic user simulations yield decreasing Cramér-von Mises divergences. In other words, it is shown that the Cramér-von Mises divergence correlates well with the qualitative difference between the real environment and the user simulation.

The dialog system presented here is a voice dialer application. This application is advertised and accessible within the AT&T research laboratory and receives daily calls from different members of the laboratory. Table 1 illustrates an example conversation An example conversation with the AT&T dialer. Text in brackets shows ASR recognition result and confidence score, which ranges from 0 to 100. The scoring function is described in the text below and summarized in Table 2. Names have been changed for privacy. In the simplest case, callers say the name of the person they want to call (the callee) and the system responds with an implicit confirmation and transfers the call. If a callee has an office and mobile (cell) phone registered, the system will ask which one to call. The dialer's vocabulary consists of approximately 30,000 distinct callees across many business units (not just staff in the research laboratory) and as a result, a recognized name (such as "John Smith") often matches multiple callees. In this case, the system can ask for a city and state. 2 Overall the prompt language is rather terse, which is designed to encourage fast, repeat usage. Table 2 provides the transcript of an example real dialog with the voice dialer.

TABLE 1

| Speaker | Transcript | Score |
| --- | --- | --- |
| System | AT&T Dialer. | −1 |
| Caller | [silent] | |
| System | First name and last name? | −1 |
| Caller | Jeannie Smith | |
| | [JENNY SCHMIDT U S ~85] | |
| System | Jenny Schmidt, USA | −1 |
| Caller | No | |
| | [NO ~95] | |
| System | First name and last name? | −1 |
| Caller | Jeannie Smith | |
| | [JEANNE SMITH ~98] | |
| System | Jeanne Smith, Office or cell? | −1 |
| Caller | Office | |
| | [OFFICE ~82] | |
| System | Office phone, Office or cell? | −1 |
| Caller | [silent] | |
| System | Dialing. | +20 |

TABLE 1-continued

| Speaker | Transcript | Score |
|---|---|---|
| | Total score | +14 |

The dialer has been active for over a year, and in that time has received more than 468 calls from 40 distinct callers. These figures exclude calls from the individuals involved with the development of the system.

The inventors selected the dialer application for this study because it is used by people with real needs. Since our focus is on user behavior, it would be less desirable to use dialogs collected from paid subjects, who in effect role-play and do not really suffer the consequences of system failures.

TABLE 2

| Condition | Score |
|---|---|
| System transfers caller to the correct destination | 20 |
| System transfers caller to the incorrect destination | −20 |
| System hangs up for any reason | −20 |
| Caller hangs up at very first turn | 0 |
| Caller hangs up after very first turn | −5 |
| Each system turn | −1 |

To illustrate the Cramér-von Mises evaluation method, one may begin by defining a scoring function. The scoring function provides a large positive reward for transferring the caller to the correct callee, a large negative reward for transferring the caller to the incorrect callee, and smaller negative rewards if the caller hangs up without making a connection. In addition, a per-turn penalty rewards faster dialogs. Table 2 explains the entire scoring function, which has also been applied to the dialog in Table 1.

The inventors then divided the 468 logged dialogs into a training set (of 320 calls with 1265 caller turns) and a test set (of 148 calls with 581 caller turns), with disjoint sets of callers. In other words, all of the calls from a given caller were grouped into either the training set or the test set. Below, the training set will be used to develop a series of user simulations, and the test set will be used for comparison and assessment.

Table 3 shows the counts of each score (x) for the training set S and test set S*. There are effectively 3 clusters of scores: a cluster in the range −31 to −23 which accounts for incorrect transfers, a cluster in the range of −12 to −7 which accounts for user hang-ups, and a cluster in the range of 9 to 17 which accounts for correct transfers. The variation within each of these clusters is due to the variation in dialog length.

TABLE 3

| x | $|x \in S^*|$ | $|x \in S|$ | x | $|x \in S^*|$ | $|x \in S|$ | x | $|x \in S^*|$ | $|x \in S|$ |
|---|---|---|---|---|---|---|---|---|
| −32 | 0 | 1 | −15 | 0 | 1 | 9 | 1 | 0 |
| −31 | 2 | 0 | −12 | 1 | 0 | 10 | 0 | 1 |
| −29 | 1 | 1 | −11 | 2 | 4 | 11 | 0 | 1 |
| −27 | 3 | 0 | −10 | 2 | 9 | 12 | 0 | 6 |
| −26 | 3 | 2 | −9 | 5 | 17 | 13 | 3 | 8 |
| −25 | 4 | 7 | −8 | 7 | 16 | 14 | 1 | 13 |
| −24 | 4 | 5 | −7 | 9 | 25 | 15 | 11 | 26 |
| −23 | 5 | 9 | −1 | 0 | 1 | 16 | 27 | 77 |
| | | | | | | 17 | 58 | 90 |

Figure 6:
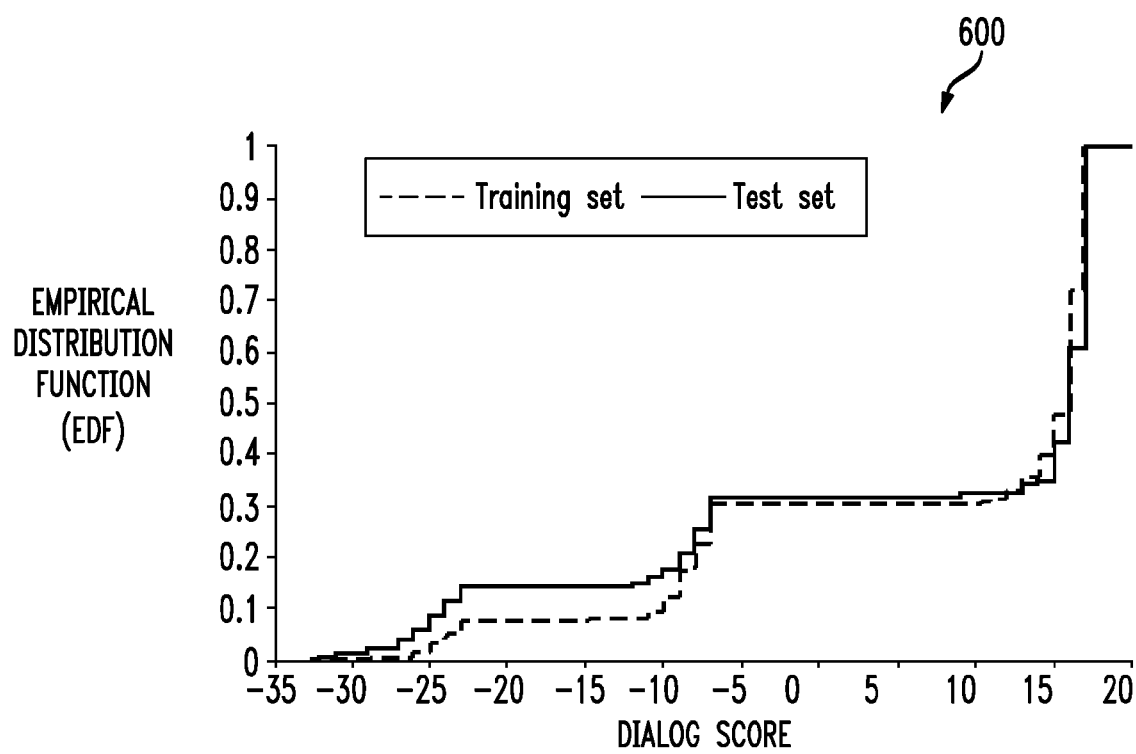
FIG. 6 illustrates an empirical distribution function of a test set and a training set.

FIG. 6 illustrates a plot 600 of this data as an empirical distribution function (EDF). This plot illustrates some of the basic properties of an EDF: for $x<\min(S)$, $F(x)=0$, for $x>\max(S)$, $F(x)=1$, and for $\min(S) \le x \le \max(S)$, $F(x)$ increases monotonically, with an increment at each $x(i) \in S$. Regions with large increments indicate a higher density of data, and flat regions indicate an absence of data.

Next, four user simulations were built. By design, the user simulations vary in how closely they mimic the behavior of a real user and real ASR. Our hypothesis is that user simulations which deviate significantly from reality will show a larger Cramér-von Mises divergence, and user simulations which more closely model real users will show a smaller Cramér-von Mises divergence.

TABLE 4

| Situation (s) | User action (a) | P(a|s) |
|---|---|---|
| System asks for name | first-name, last-name | 0.692 |
| | first-name, last-name, city, state | 0.033 |
| | out of grammar | 0.147 |
| | silent | 0.039 |
| | hang-up | 0.089 |
| System confirms correct name | yes | 0.089 |
| | no | 0.097 |
| | out of grammar | 0.040 |
| | silent | 0.766 |
| | hang-up | 0.008 |
| System confirms incorrect name | yes | 0.047 |
| | no | 0.422 |
| | out of grammar | 0.063 |
| | silent | 0.313 |
| | hang-up | 0.156 |

First, two different user behavior models were created. A handcrafted user behavior model was designed which assumed that the user is cooperative and patient, always answering questions as requested, and never hanging up. Second, a stochastic user behavior model was estimated from the training dialog data. At each system prompt, categories of user responses were counted, including cooperative answers, out-of-grammar speech, silence, and hang-up. For cooperative answers, combinations of slots were counted—for example, if a user was observed to say "Jason Williams, Florham Park" in the training set of dialogs, this includes the first-name, last-name, and city slots. These frequency counts were used to form a statistical model of user behavior using simple maximum-likelihood estimation. A portion of the resulting statistical model of user behavior is shown in Table 4.

Next, two speech recognition simulations were created. Each speech recognition simulation takes as input the text of the user's speech, and produces as output a (possibly erroneous) text string and a confidence score, which indicates the reliability of the output text string. The confidence score is used by the dialog manager to decide whether to accept or discard the output.

The first speech recognition simulation made no errors: in-grammar speech was recognized accurately (with the maximum confidence score of 100), silence was correctly identified, and out-of-grammar speech was discarded (via a confidence score of zero). The second speech recognition simulation modelled the errors and confidence scores found in the training set. Error statistics were computed by examining each recognition attempt in the training set, and determining whether the user's speech a was in-grammar, out-of-grammar, or empty, and also determining whether the recognition outcome ã was correct, incorrect, or empty. Counts of each (a, ã) pair were made and used to compute conditional probabilities P(ã|a), shown in Table 5.

TABLE 5

| User action type (a) | Recognition outcome (ã) | P(ã\|a) |
|---|---|---|
| In-grammar speech | Recognized correctly | 0.795 |
| | Recognized incorrectly as other speech | 0.190 |
| | Recognized incorrectly as silence | 0.015 |
| Out-of-grammar speech | Recognized incorrectly as other speech | 0.921 |
| | Recognized incorrectly as silence | 0.079 |
| Silence | Recognized incorrectly as other speech | 0.075 |
| | Recognized incorrectly as silence | 0.925 |

For each (a, ã) pair, confidence score frequencies in the training set were counted and used to construct empirical distribution functions (EDFs). FIG. 6 shows two of these EDFs for in-grammar speech. As expected, these plots show that the confidence score for incorrect recognitions is more likely to be low (80% are less than 30), whereas the confidence score for correct recognitions is more likely to be high (80% are greater than 60).

To simulate the speech recognition process at runtime, it is first determined whether the user behavior model's speech a is in-grammar, out-of-grammar, or empty. Given the type of user speech, a recognition outcome ã is then sampled based on the statistics in Table 5. If the sampled recognition outcome is "Recognized incorrectly as other speech", then a new utterance is sampled from the grammar at random. Finally, given both the type of user speech and the recognition outcome, a confidence score is sampled from the appropriate EDF, such as the two shown in FIG. 6. The recognition result and confidence score are then passed to the dialog system. For each grammar, the dialog manager has a confidence rejection threshold. If the confidence score is greater than this threshold, then it is accepted; otherwise, it is treated as a likely error and discarded.

Figure 7:
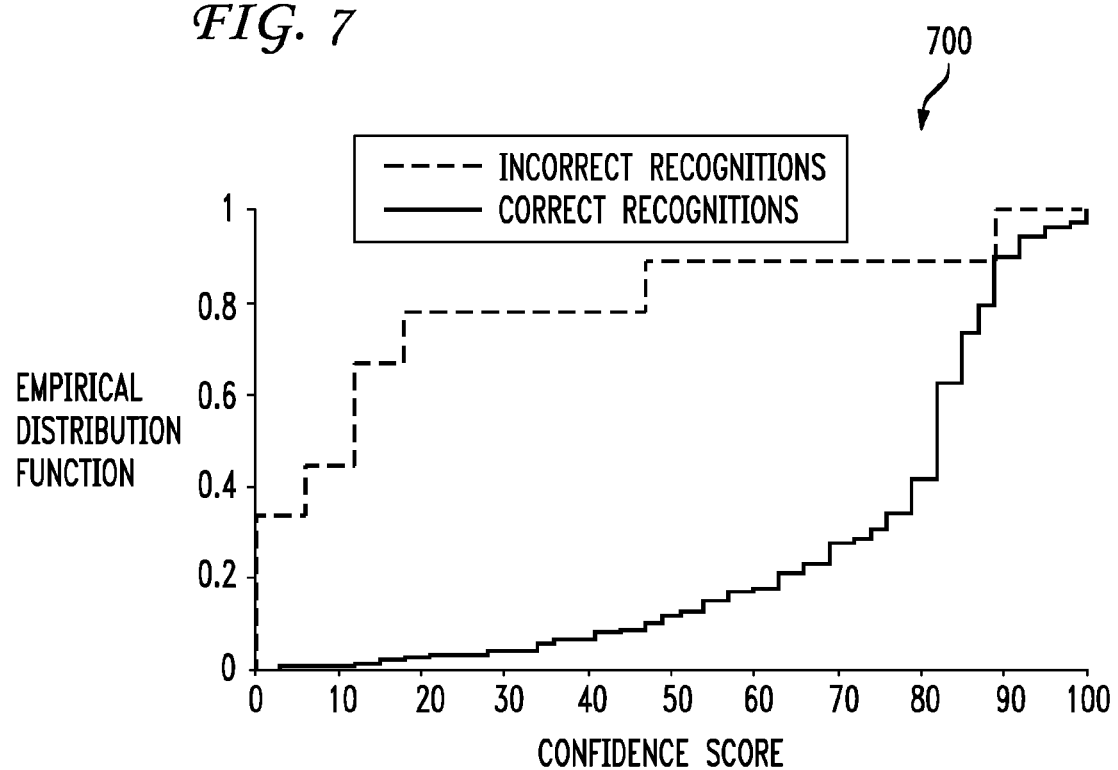
FIG. 7 illustrates a distribution function of confidence scores for correct recognition and incorrect recognitions given that the user's speech was in grammar.

As an example of this process, suppose the user behavior model generates the output "Jason Williams". The ASR simulation first checks whether this speech (a) is in the grammar; finding that it is in-grammar, it would sample an outcome (ã) from the first three rows in Table 5. Suppose it sampled the outcome "Recognized incorrectly as other speech" (which occurs with p=0.190). In this case, some other output would be sampled from the grammar, such as "Jay Wilpon", and this would be output as the recognition result instead of "Jason Williams". Since this is an incorrect recognition, a confidence score is then sampled according to the empirical distribution of the dotted line in the graph 700 FIG. 7.

Figure 8:
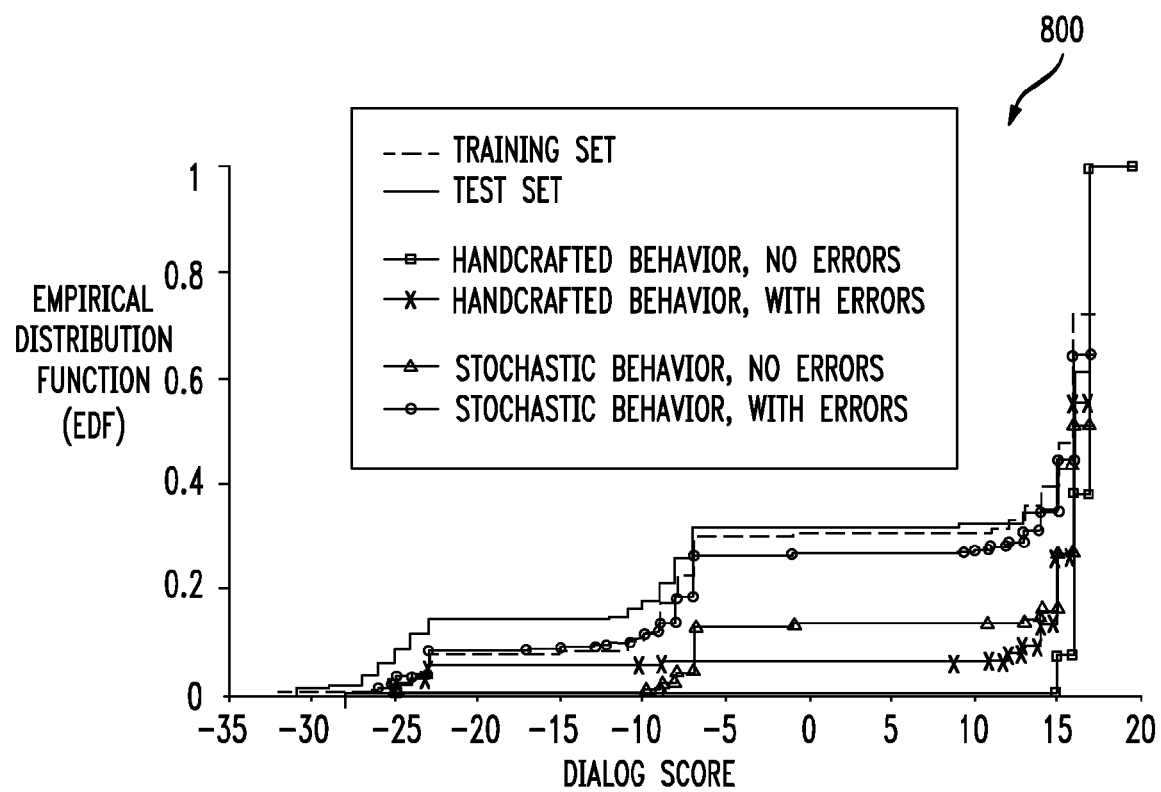
FIG. 8 illustrates a distribution function for all user simulations, the training set and the test set.

The inventors also ran experiments and tested for results. Each of the two user behavior models was run with each of the ASR simulations for 1000 dialogs, and each dialog was scored using the scoring function, described in table 2. The EDF for each of the user behavior model/ASR model pairs was then computed and plotted. Results are shown in the plot 800 of FIG. 8.

Finally, using the EDFs computed for each user simulation, the normalized Cramér-von Mises divergences from the test set were computed. Results are shown in Table 6, which shows an empirical distribution function of all user simulations, the training set and the test set.

TABLE 6

| Corpus of model dialogs used to compute EDF $\hat{F}$ | $D(F\|\|\hat{F})$ |
|---|---|
| Handcrafted user behavior + perfect ASR | 0.36 |
| Modeled user behavior + perfect ASR | 0.21 |
| Handcrafted user behavior + modeled ASR | 0.20 |
| Modeled user behavior + modeled ASR | 0.067 |
| Training set (real dialogs) | 0.098 |

The handcrafted user behavior model with no ASR errors produces the largest Cramér-von Mises divergence; the stochastic user behavior with ASR errors produces the smallest divergence; and the other combinations are between these two. In other words, as the predictive accuracy of the user simulation increases, its Cramér-von Mises divergence decreases, as expected. In this experiment, the best and worst user simulations were known in advance by design: the key result is that the Cramér-von Mises divergence has recovered this ordering, and this finding lends support to our claim that the normalized Cramér-von Mises divergence is a suitable metric for evaluating user simulations.

In addition, the divergence from the held-out test set to the training set is nearly identical to the best user simulation. Of course, formally it can never be proved that two sets of samples are drawn from the same distribution. Even so, for this scoring function and this number of real dialogs N0, the predictive accuracy of the best user simulation is within the bounds of sampling error measured with held-out data, implying some reassurance in its quality.

This finding also raises an important question: the empirical distribution functions are subject to sampling noise: indeed, the divergence from the test set to the training set— two sets of real data—is not zero but rather 0.098. It is important to understand whether this difference is statistically significant. More generally, given that the number of real dialogs is often limited, the inventors seek to provide guidance to system developers and practitioners on the reliability of a rank ordering of user simulations calculated with the Cramér-von Mises divergence test.

To begin, consider the cumulative distribution functions (CDF) Pi (x) and probability density functions (PDF) pi (x) for the user population and two user simulations. By definition, these describe the true cumulative distribution and densities of the user population and the two user simulations in the presence of an infinite number of samples. The normalized Cramér-von Mises divergence on the true distributions, which is also called the normalized Cramér-Smirnov-von Mises test, can be computed as:

$$D(P_0\|P_j) = \beta \sqrt{\int (P_0(x) - P_j(x))^2 p_0(x) dx}$$

where $\beta$ is a normalization constant $$\beta = \sqrt{3}.$$

Those of skill in the art will understand how to derive $\beta$.

If this test is applied to each user simulation and it is found that $D(P_0\|P_1) < D(P_0\|P_2)$, then it could be concluded that user simulation 1 is better than user simulation 2 (and visa-versa). Since these quantities are exact, there is no chance that an observed difference would be due to noise: any difference is statistically significant.

In practice however, one will not have access to $P_i$ (x) nor $p_i$ (x). Rather, samples from these distributions $S_j = (x_{(1)}^j, \ldots, x_{(n_j)}^j)$ exist which are used to compute $D(F_0\|F_i)$. The key issue is that $D(F_0\|F_i)$ is an estimate of $D(P_0\|P_i)$ and therefore subject to sampling error.

The inventors address this problem by constructing a simulation experiment. The inventors randomly generate distributions for a user population $P_0(x)$ and two user simulations $P_1(x)$ and $P_2(x)$. Then, the inventors computed the true ordering of the two user simulations as the ordering of $D(P_0\|P_1)$ and $D(P_0\|P_2)$. Next, inventors sample from $P_0(x), P_1(x),$ and $P_2(x)$ to produce $F_0(x)$, $F_1(x)$ and $F_2(x)$, and compute predicted ordering of the two user simulations as the ordering of $D(F_0\|F_1)$ and $D(F_0\|F_2)$. Finally, it is determined if the predicted ordering agrees with the true ordering, and set an indicator variable q:

$$q = \begin{cases} 1, \text{ if predicted rank ordering matches true rank ordering} \\ 0, \text{ if predicted rank ordering does not match true rank ordering} \end{cases}$$

This whole process is repeated M times, and for each iteration in, $D(F0\|F1)$, $D(F0\|F2)$, and q are stored as Dm 1, Dm 2, and qm, respectively. Once the sampling is complete, a plot is constructed which quantizes D1 and D2 into square regions. Within each region, the average value of q notated $\bar{q}$ is computed, which corresponds to the percentage of the time that the sampled data yields the same model ordering as the true data. In other words, the end result is a statement of the accuracy of the ordering of 2 user simulations for a given $D_1$, $D_2$, $N_0$, $N_1$ and $N_2$.

Concretely, $p_j(x)$ are multi-modal densities represented as the weighted sum of Gaussians, with densities $$p_j(x) = \sum_{k=1}^{K_j} w_{j,k} N(\mu_{j,k}, \sigma_{j,k}) \quad (7)$$

where weights $w_{j,k}$ are sampled uniformly and scaled such that $0 \le w_{j,k} \le 1, \forall j,k$ $\Sigma_k w_{j,k} = 1, \forall j \quad (8)$ and means (μ), and variances (σ) are sampled uniformly from the range:

$\mu_{j,k} \sim [0, 100], \forall j,k$ $\sigma_{j,k} \sim [1, 5], \forall j,k, \quad (9)$ In these experiments, the number of dialogs from each user simulation is N1=N2=1000, and M=40,000 iterations are run for each experiment. The number of modes Kj was set to 2. Experiments are run for various number of dialogs from the "real" user N0 ranging from 50 to 1000.

Figure 9:
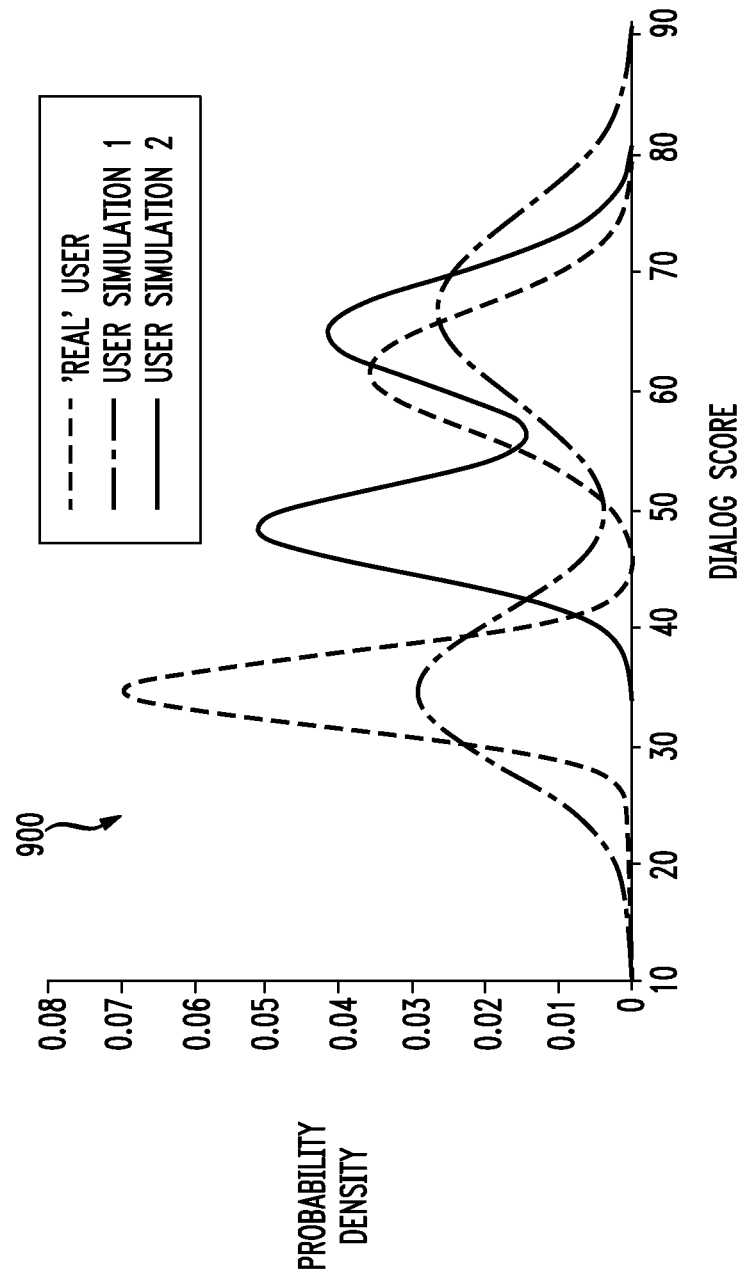
FIG. 9 illustrates example probability density functions for a real user and two user simulations.
Figure 10:
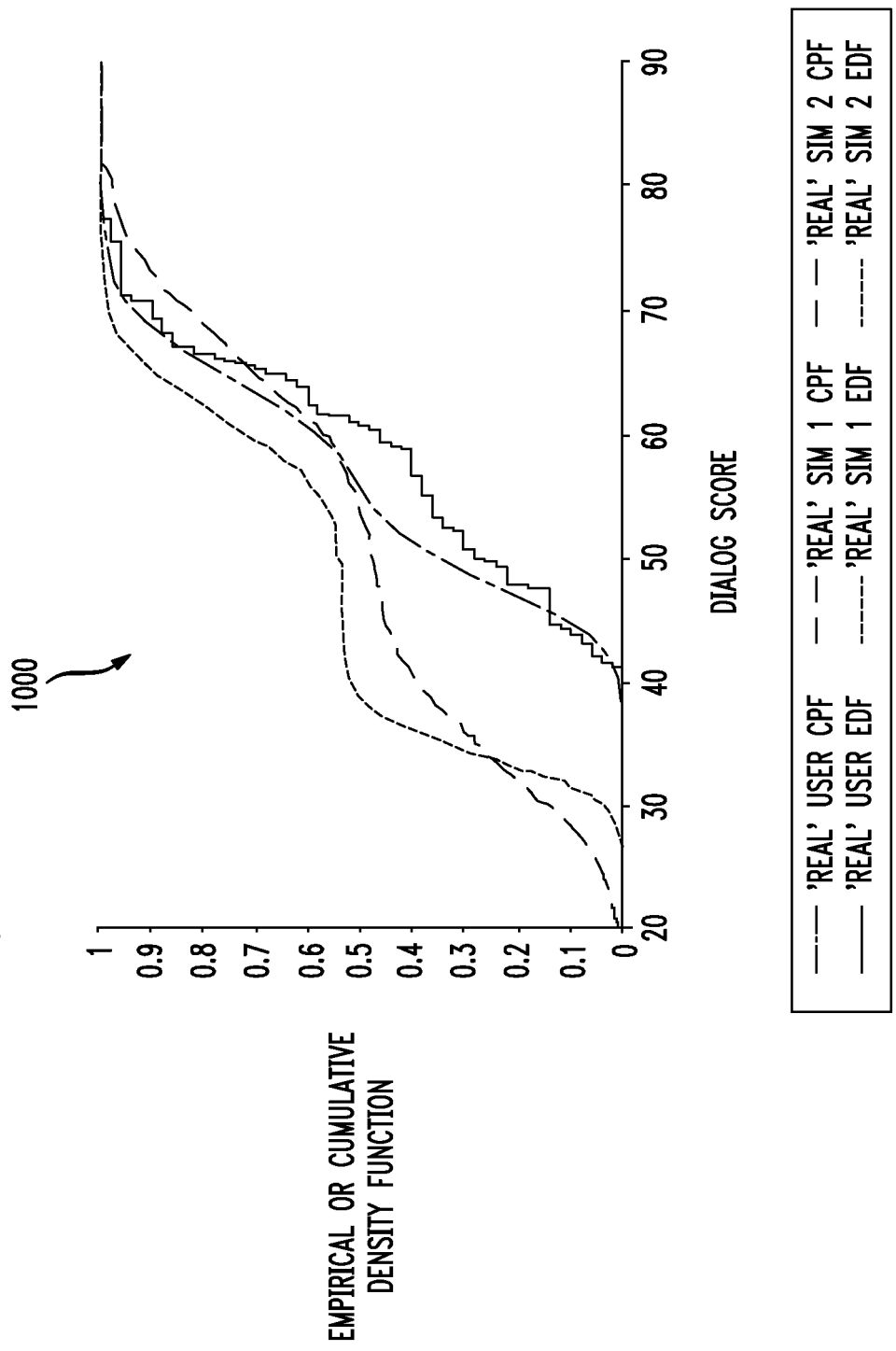
FIG. 10 illustrates an example cumulative probability function for the real user and two user simulations.

FIGS. 9 and 10 shows one iteration of this process. FIG. 9 shows a graph 900 of the probability density functions pj (x). FIG. 10 shows a graph 100 of these densities as cumulative distribution functions Pj (x), along with the empirical density functions Fj (x) for N1=N2=1000 dialogs with each user simulation and N0=50 dialogs with the "real" user. In this iteration, the true divergences are $D(P0\|P1)=0.319$ and $D(P0\|P2)=0.406$, and the sampled divergences are $D(F0\|F1)=0.317$ and $D(F0\|F2)=0.465$. Since the sampled diversions predict the same ordering as the true divergences—i.e., $D(P0\|P1)<D(P0\|P2)$ and $D(F0\|F1)<D(F0\|F2)$—then q=1 and the tuple (D1, D2, q)=(0.317,0.465,1) is stored.

FIG. 10 shows the results of the simulations. In this figure, black regions indicate $\bar{q}<0.95$, white regions indicate $\bar{q}>0.99$, and various shades of gray indicate intermediate values.

FIG. 10 provides an empirical measurement of the reliability of a rank ordering given the divergences D1 and D2. For example, suppose that two user simulations (run for 1000 dialogs each) are compared to a corpus of 50 real dialogs, and the two divergences measured are D1=0.1 and D2=0.3. This would imply that user simulation 1 is more accurate than user simulation 2, and the N0=50 panel of FIG. 10 indicates that this ordering is reliable with p>0.98. Had the two divergences been D1=0.2 and D2=0.3, the ordering would be reliable with p<0.95. On the other hand, had the corpus of real dialogs consisted of N=200 dialogs, then the ordering implied by the two divergences D1=0.2 and D2=0.3 would be more reliable, with p>0.97.

Figure 11A:
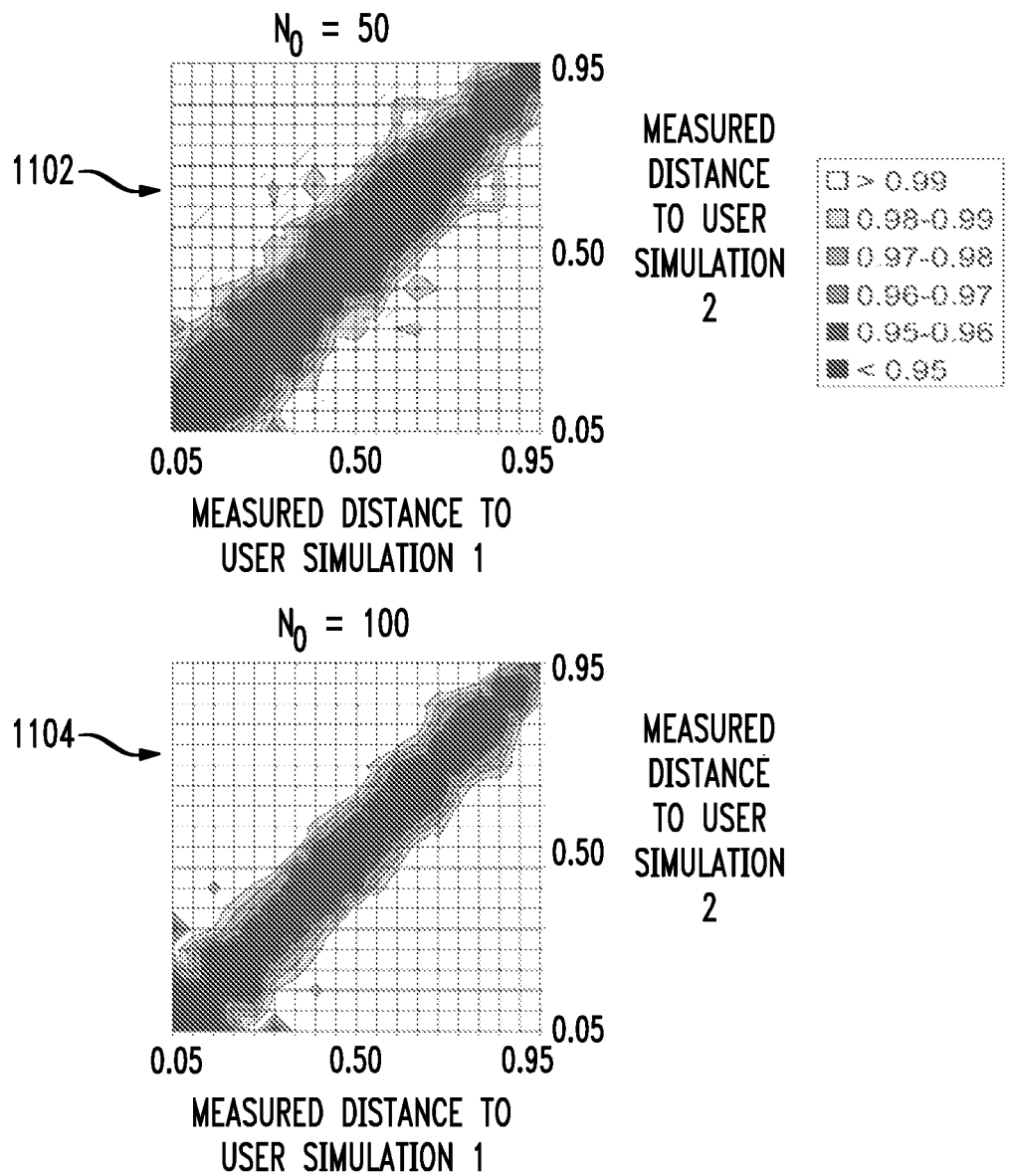
FIGS. 11A-11C illustrate a measure divergence to user simulation 1 and user simulation 2 verses order reliability for a number of dialogs.
Figure 11B:
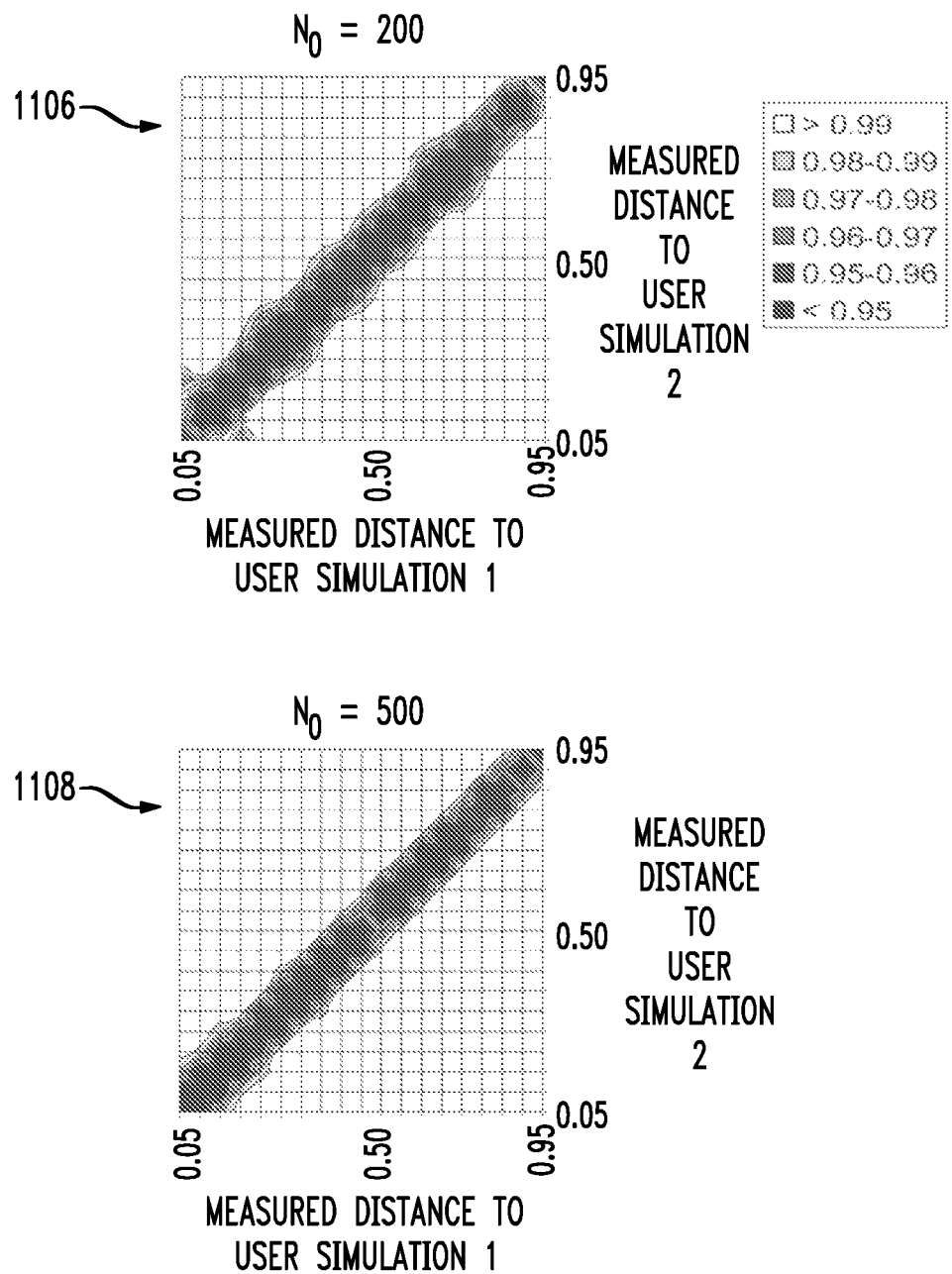
Figure 11C:
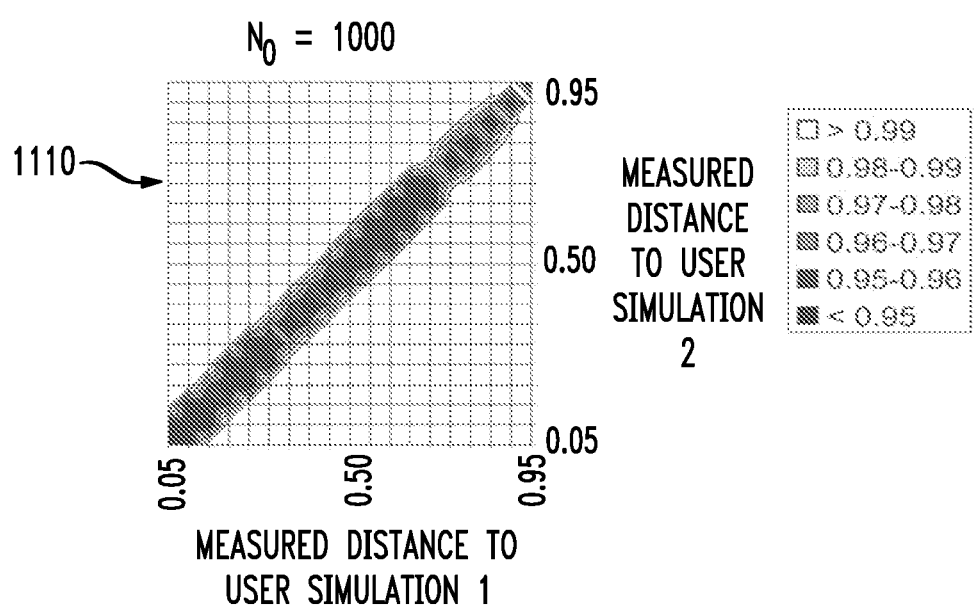
Figure 12:
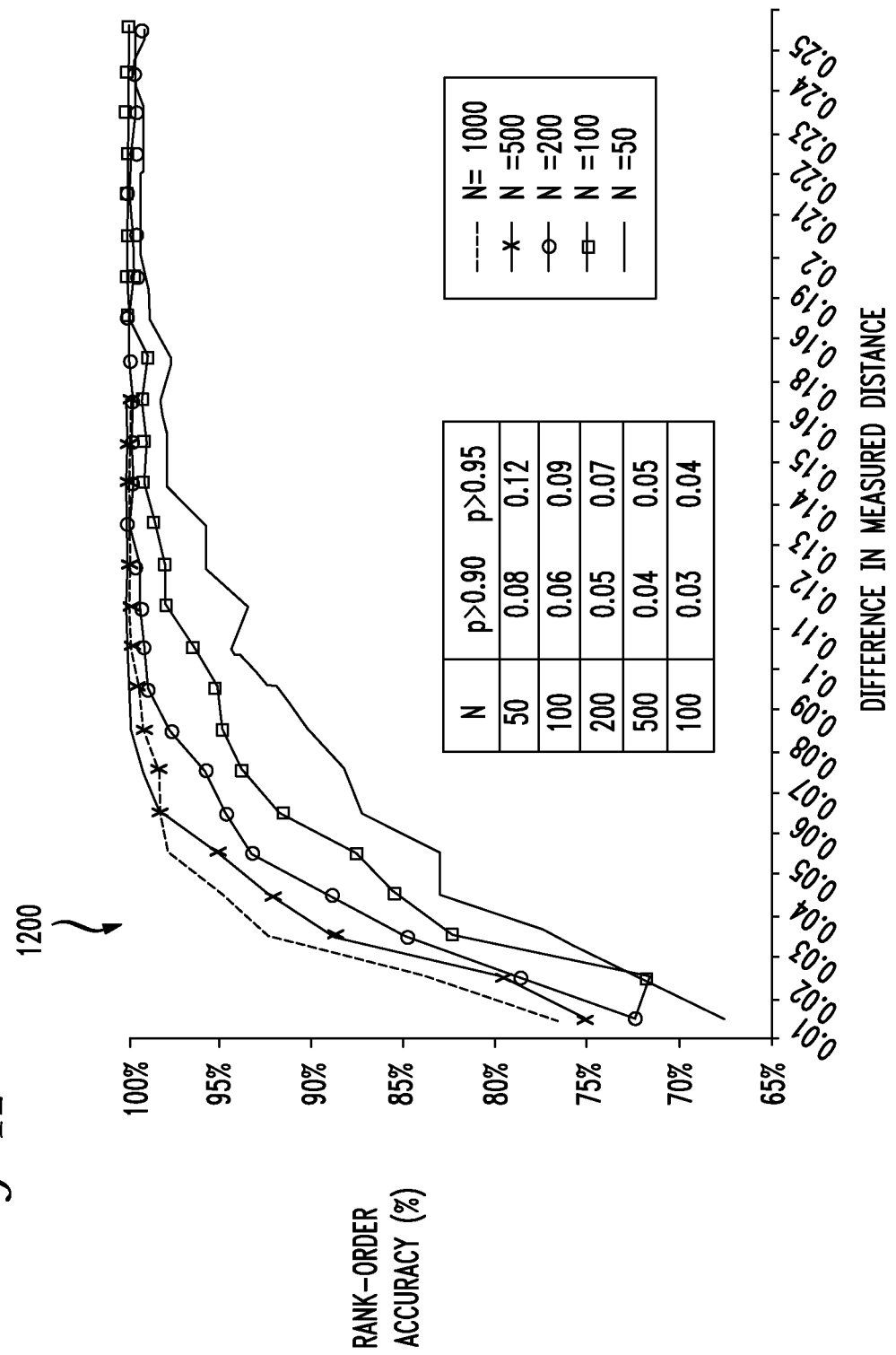
FIG. 12 illustrates a difference between divergence to user simulation 1 and simulation 2 verses order reliability for a number of dialogs.

These figures also show that the regions of lower probability lie along essentially straight lines parallel to D1=D2. This is significant because it implies that the reliability of an ordering is determined mainly by the difference between D1 and D2, rather than being dependent on their actual values. This relationship is shown in FIGS. 11A-11C.

Table 7 summarizes results from experiments. This table provides an indication of what differences in divergences are required to conclude an ordering of two user simulations is reliable with confidence 90% and 95%. The normalized Cramér-von Mises divergence, together with this table of critical values, provides a method for researchers to rank order user simulations, and to determine whether that rank ordering is significant.

TABLE 7

| N | p > 0.90 | p > 0.95 |
|---|---|---|
| 50 | 0.08 | 0.12 |
| 100 | 0.06 | 0.09 |
| 200 | 0.05 | 0.07 |
| 500 | 0.04 | 0.05 |
| 1000 | 0.03 | 0.04 |

Above, the question was raised whether the differences observed between the different user simulations in the dialer application were statistically significant. In those experiments, there were 148 dialogs in the testing set. The results in Table 7 indicate that, for 100 real dialogs, a difference of 0.06 indicates a 90% ordering accuracy, and a difference of 0.09 indicates a 95% ordering accuracy. This implies that the handcrafted user behavior with no ASR errors is significantly worse than the other user simulations, and that the stochastic user behavior with ASR errors is significantly better than the other user simulations. Further, the difference observed between the stochastic user behavior model with ASR errors (0.067) and the training set (0.098) does not allow a statistically significant ordering to be inferred.

The inventors have addressed the problem of evaluating and rank-ordering user simulations. Although user simulations are increasingly used in conjunction with machine learning for the development and assessment of spoken dialog systems, there is no accepted quality measure for user simulations. This disclosure has sought to provide designs and practitioners with a simple, principled method of evaluating and rank-ordering user simulations, based on the normalized Cramér-von Mises divergence. The disclosed metric, which fills the same role as word error rate for speech recognition, perplexity for language modelling, or BLEU score for translation, enables user simulations to be directly compared and rank-ordered—i.e., to judge whether user simulation A or B better predicts the performance of a dialog system.

Because different aspects of performance are important in different domains, this method relies on a domain-specific scoring function which assigns a real-valued score to each dialog in the system's domain. This requirement is easily satisfied because this scoring function is already a prerequisite of many machine learning algorithms, such as Markov decision processes and partially observable Markov decision processes.

The inventors view a user simulation as a predictive tool: a dialog system interacting with a population of users will produce a distribution over these scores, and the aim of a user simulation is to predict this distribution as accurately as possible. This work has advocated using the normalized Cramér-von Mises divergence to measure the difference between the real and simulated score distributions. The normalized Cramér-von Mises divergence is attractive for this task because it makes no parametric assumptions, requires no tuning parameters, accounts for the notion of samples from a "true" distribution and a "model" distribution, and allows measurements across domains to be compared on the same scale.

An illustration with a corpus of real dialogs collected from real system usage shows that as the user simulation is made increasingly realistic, the normalized Cramér-von Mises divergence between the real dialogs and the synthetic dialogs decreases. This illustration supports the disclosure that the normalized Cramér-von Mises divergence indeed provides a measurement of the extent to which the user simulation is faithfully imitating real users. Further, a series of simulation experiments has explored what magnitude of difference in Cramér-von Mises divergences is required to infer a statistically significant rank-ordering, and we have developed a concise table that enables researchers and practitioners to judge whether the observed difference between two user simulations implies a true, statistically significant difference.

The inventors anticipate that dialog systems will make increasing use of machine learning, and evaluations with real users will always be the gold standard. However, evaluations with real users will remain expensive, and therefore it is anticipated that interim evaluations with user simulations will also become more widespread. For these interim evaluations to be trusted, the quality of the user simulations must themselves be tested in some way. The evaluation metric suggested here is straightforward to apply, concise to report, and easy to interpret.

Figure 13:
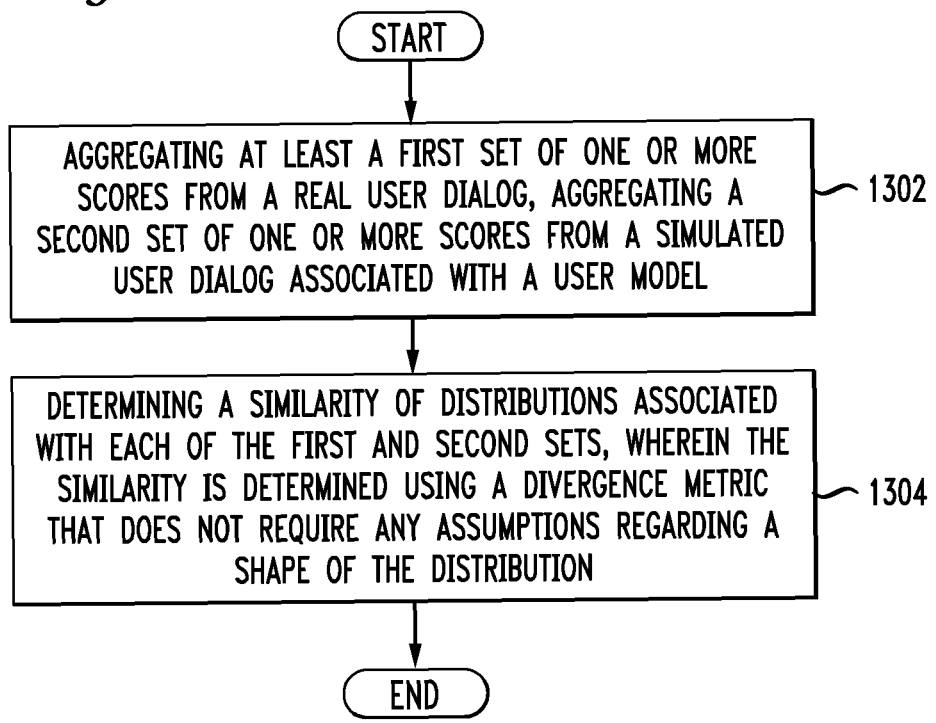
FIG. 13 illustrates a method embodiment of the invention.

FIG. 13 illustrates a method embodiment of the invention. As shown in this figure, an example method embodiment includes a method of employing user simulation in a spoken dialog system. The method is primarily used to evaluate a user model that is associated with testing a spoken dialog system. The method includes aggregating at least a first set of one or more scores from a real user dialog and aggregating a second set of one or more scores from a simulated user dialog associated with a user model (1302), determining a similarity of distributions associated with each of the first and the second sets, wherein the similarity is determined using a divergence metric that does not require any assumptions regarding a shape of the distribution (1304). As noted above, it is preferable that the divergence metric is a Cramér-von Mises divergence that is normalized. The Cramér-von Mises divergence places more emphasis on the mean in determining the similarity than does the KL measurement. The determined similarity measures a parameter associated with the user model which is preferably a goodness parameter in a manner known to those of skill in the art. This is a measurement of how good the user model is at simulating real users when testing or evaluating the spoken dialog system. Another aspect of the method embodiment includes modifying either the user model or the spoken dialog system based on the parameter associated with the user model.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A method comprising:
aggregating, via a processor, a first set comprising a score from a real user dialog and aggregating a second set comprising a score from a simulated user dialog associated with a user model; and
determining a similarity of distributions associated with each of the first set and the second set, wherein the similarity is determined using a divergence metric that does not require any assumptions regarding a shape of the distributions, wherein the divergence metric is normalized.

2. The method of claim 1, wherein the divergence metric is a Cramér-von Mises divergence.

3. The method of claim 1, wherein the determined similarity measures a parameter associated with the user model.

4. The method of claim 3, wherein the parameter measures how good the user model is at simulating real users.

5. The method of claim 3, further comprising:
modifying one of the user model and the spoken dialog system based on the parameter associated with the user model.

6. A system comprising:
a processor; and
a computer-readable storage medium having instructions stored which, when executed by a computing device, cause the computing device to perform operations comprising:
aggregating a first set comprising a score from a real user dialog and aggregate a second set comprising a score from a simulated user dialog associated with a user model; and
determining a similarity of distributions associated with each of the first set and the second set, wherein the similarity is determined using a divergence metric that does not require any assumptions regarding a shape of the distributions, wherein the divergence metric is normalized.

7. The system of claim 6, wherein the divergence metric is a Cramér-von Mises divergence.

8. The system of claim 6, wherein the determined similarity measures a parameter associated with the user model.

9. The system of claim 8, wherein the parameter measures how good the user model is at simulating real users.

10. The system of claim 8, the computer-readable storage medium having additional instructions stored which result in the operations further comprising modifying one of the user model and the spoken dialog system based on the parameter associated with the user model.

11. A computer-readable storage device having instructions stored which, when executed by a computing device, cause the computing device to perform operations comprising:
aggregating a first set comprising a score from a real user dialog and aggregating a second set comprising a score from a simulated user dialog associated with a user model; and
determining a similarity of distributions associated with each of the first set and the second set, wherein the similarity is determined using a divergence metric that does not require any assumptions regarding a shape of the distributions, wherein the divergence metric is normalized.

12. The computer-readable storage device of claim 11, wherein the divergence metric is a Cramér-von Mises divergence.

13. The computer-readable storage device of claim 11, wherein the determined similarity measures a parameter associated with the user model.

14. The computer-readable storage device of claim 11, the computer-readable storage device having additional instructions stored which result in the operations further comprising:
modifying one of the user model and the spoken dialog system based on the parameter associated with the user model.

* * * * *